United States Patent [19]
Schott

[11] Patent Number: 5,121,030
[45] Date of Patent: Jun. 9, 1992

[54] ABSORPTION FILTERS FOR CHLOR DISPLAY DEVICES

[75] Inventor: Dan J. Schott, Phoenix, Ariz.

[73] Assignee: Honeywell Inc., Minneapolis, Minn.

[21] Appl. No.: 347,107

[22] Filed: May 3, 1989

[51] Int. Cl.⁵ .............................. H04N 5/72
[52] U.S. Cl. .................... 313/474; 313/475; 313/479; 358/253; 359/68; 359/885; 385/115
[58] Field of Search ............ 313/474, 475, 478; 358/250, 252, 253; 350/311, 96.24, 96.25, 96.27, 317, 339 F

[56] References Cited

U.S. PATENT DOCUMENTS

| | | | |
|---|---|---|---|
| 2,618,759 | 11/1952 | Hoyt | 350/317 X |
| 3,210,585 | 10/1965 | McNaney | 313/463 |
| 3,638,060 | 1/1972 | Wacher | 313/467 X |
| 3,814,618 | 6/1974 | Kimpel et al. | 350/96.2 X |
| 4,135,112 | 1/1979 | Fisher et al. | 313/474 X |
| 4,185,228 | 1/1980 | Oberg | 358/252 |
| 4,354,739 | 10/1982 | Scanton et al. | 358/253 |
| 4,386,143 | 5/1983 | Satu et al. | 350/317 X |
| 4,639,088 | 1/1987 | Sugioya et al. | 350/339 F |
| 4,701,789 | 10/1987 | Bonye | 313/475 X |
| 4,786,148 | 11/1988 | Sekimura et al. | 350/317 X |
| 4,846,556 | 7/1989 | Haneda | 350/320 X |

FOREIGN PATENT DOCUMENTS

| | | | |
|---|---|---|---|
| 148473 | 11/1979 | Japan | 313/474 |
| 2034513 | 6/1980 | United Kingdom | 350/96.27 |

Primary Examiner—Donald J. Yusko
Assistant Examiner—Michael Horabik
Attorney, Agent, or Firm—Arnold L. Albin; Dale E. Jepsen

[57] ABSTRACT

A contrast enhancement filter for color displays, particularly adapted for color CRT tubes of the shadow mask type. A transparent plate has applied thereon absorptive areas, each area dyed with a primary color corresponding to the color dots of the CRT display face and a plurality of such color areas randomly disposed over each color dot. Since the absorption areas are spacially independent, each color area acts independently of the others. The filter provides bandpass efficiency comparable to monochrome filters, and has a broad viewing range essentially independent of angle of vision. In a further embodiment, colored oriented fiber-optic elements are disposed over the phosphor dots in a predetermined array, allowing the filter plate to replace a conventional faceplate and filter combination structure, while providing a selective viewing angle of high contrast. The filter is suitable for any light-responsive display screen, also including liquid crystal elements.

8 Claims, 5 Drawing Sheets

ABSORPTION FILTERS FOR CHLOR DISPLAY DEVICES

BACKGROUND OF THE INVENTION

1. Field of the Invention

The invention pertains generally to contrast enhancement filters for viewing color displays, and more particularly to absorption filters providing improved viewability under conditions of high ambient light levels.

2. Description of the Prior Art

When utilizing many displays such as cathode ray tube displays in high brightness ambient conditions, the information on the display becomes difficult to read due to reflections from the viewing screen. In such high ambients, reflected light from the viewing surface can exceed the internal light generated by the display itself, thereby resulting in a sufficient loss of contrast to wash out the presented information.

One known prior art type of filter uses neutral density filtration. This has been achieved by providing colloidal suspensions such as silver in the glass composition of the faceplate or the implosion panel, or a colloidal graphite suspension within an adhesive material used to bond the implosion panel to the faceplate, as in U.S. Pat. No. 3,879,627. This type of filter transmits a fraction of the light passing through it, which fraction is independent of the color emissions (i.e., wavelength). Since the light from the display passes through the filter once, while ambient light reflected from the display must pass through the filter twice, the ratio of display brightness to ambient background brightness is thereby enhanced.

When exposed to high brightness ambient lighting conditions, such as bright sunlight, the attenuation of transmitted light by a neutral density filter that is required to provide a satisfactory contrast ratio is so high that the resulting display brightness is too low to be acceptable. Another approach is selective filtration, obtained, for example, by the use of colored glass for either the tube faceplate or the implosion panel, or by adding colorants to the bonding material between the faceplate and the implosion panel. Such an approach is useful for a monochrome display, where the absorption characteristics of the filter may be formulated to provide a narrow band of transmission at the primary display wavelength. As with the neutral density filter, contrast is enhanced by the greater losses suffered by the ambient light in its reflected passage through the filter, as against a single passage through the filter of internally produced display light of monochromatic wavelength. However, at other wavelengths, the narrow band filter absorbs substantially all the ambient light. Therefore the contrast ratio, defined herein as the ratio of display brightness plus background brightness to background ambient brightness, is much greater with a narrow band filter than with a neutral density filter. However, this approach requires a different colorant for each type of phosphor screen.

Optical filters utilized by the prior art for color displays include absorption filters and thin film filters. An absorption filter is herein defined as one adapted to pass a narrow spectrum of light and substantially absorb all others. Such filters are relatively independent of the viewing angle. Color displays, such as are provided by color cathode ray tubes, typically emit three primary color wavelengths, such as red, green, and blue, which may be combined to derive many colors. The ideal filter for a color CRT is comprised of three individually operative pass bands, each transmitting a narrow band of red, green or blue wavelengths emitted by the display. Materials are known which permit reasonably selective transmission of each of these wavelengths individually. However, when such materials are either mixed in a single layer, or when individual filters for each wavelength are cascaded, such filters will mutually absorb wavelengths transmitted by the others. In the prior art, selection of colorants and materials to provide selective transmission of multiple colors has been hampered by the co-existent requirements that each constituent element must transmit a predetermined narrow band of primary color wavelengths, yet not unduly absorb another wavelength band. Satisfactory materials with the precise desired transmission and absorption characteristics have not been found. The best of such prior art filters, as commonly used in aircraft for color CRT displays, has far from the ideal absorption spectrum.

A further prior art approach that does not rely on absorbing materials to produce the desired transmission characteristics uses complex multilayer optical thin films or holograms. The effectiveness of these types of filters is reduced by a strong angular dependence inherent in the filter. The transmittance and reflectance properties are determined by interference phenomena which depend on optical path length, which in turn depends on the viewing angle. Therefore, these filters are appropriate only in systems whose viewing angle is tightly constrained.

Yet another approach to improve contrast is simply to increase the brightness level of the displayed information. However, thermal and longevity limitations preclude increasing brightness in conventional raster color displays to levels that are readable in daylight. A substantial increase in brightness can be obtained by operation in a vector (or stroke) writing mode. Vector writing has the disadvantage of being less efficient in terms of power consumption and the type of information which can be displayed.

SUMMARY OF THE INVENTION

The present invention overcomes the disadvantages of the prior art by providing a contrast enhancement filter containing absorptive dyed colorants which are spatially separated. Each color element can therefore act independently of the others. Since absorption effects are used rather than interference effects, the filter performance is essentially independent of angle of vision over a broad viewing range.

The invention comprises a transparent substrate in which are defined a plurality of spaced areas of a predetermined color transmissibility. Each area is selectively dyed to transmit a narrow band color spectrum and substantially to absorb other color wavelengths. The colored areas are patterned so that a plurality of such areas comprising at least one primary color wavelengths overlay each of the discrete light-responsive elements of a corresponding primary color wavelength of a color display, wherein each of said elements is adapted for emitting or transmitting light in a predetermined primary color wavelength.

In a preferred embodiment, particles of fiber-optic material are selectively dyed to provide of a narrow-band transmission the primary colors, and dispersed within the base material of a planar substrate. The fiber-optic particles are selected to have identical indices of refraction to avoid unwanted collimating of the display information, sized so that a plurality of fibers of a given primary absorption characteristics are overlaid on a corresponding primary emission color dot. Preferably, the particles will be randomly disposed over the color dots to avoid Moire' effects.

DESCRIPTION OF THE PREFERRED EMBODIMENT

Figure 1:
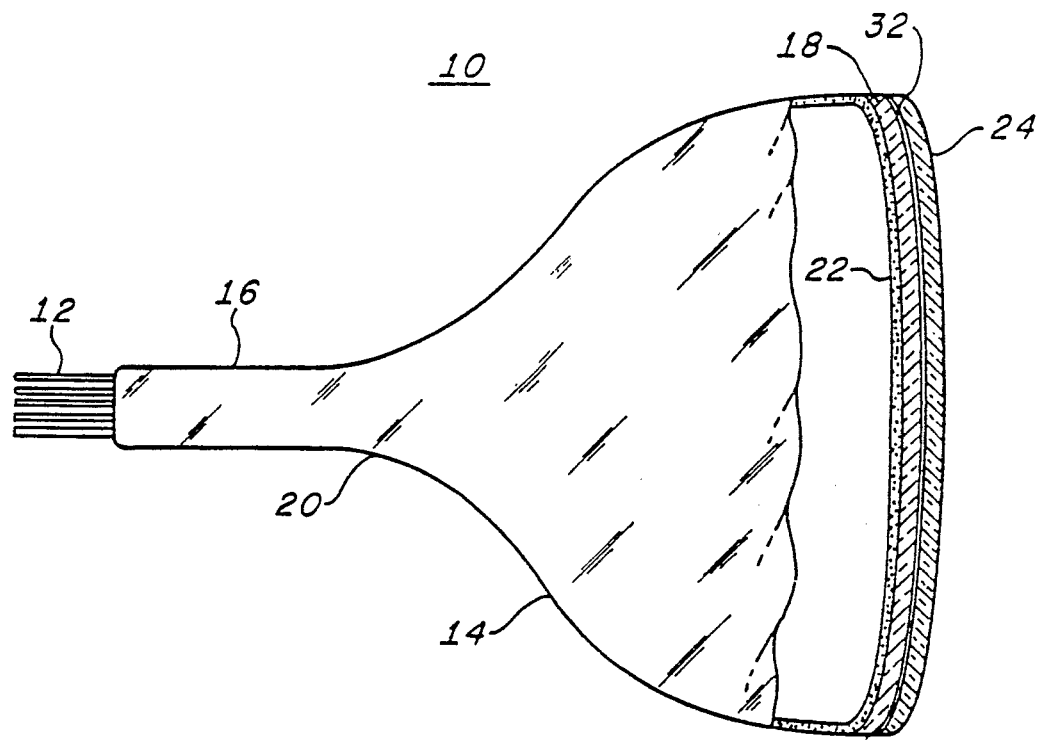
FIG. 1 is an elevation view partly in vertical section of a cathode ray tube.

FIG. 1 is a view showing a cathode ray display tube 10 or other luminescent display device. Electrical terminals 12 project longitudinally from a vacuum sealed envelope 14 including a cylindical neck portion 16, a viewing or faceplate face 18, and a transition section 20 joining the latter two elements. The display tube 10 may also include the usual internal elements (not shown) in the form of a cathode for emitting an electron beam, an anode, an electron beam deflecting structure, and a phosphor layer 22 affixed to the inner surface of the faceplate 18.

Figure 2:
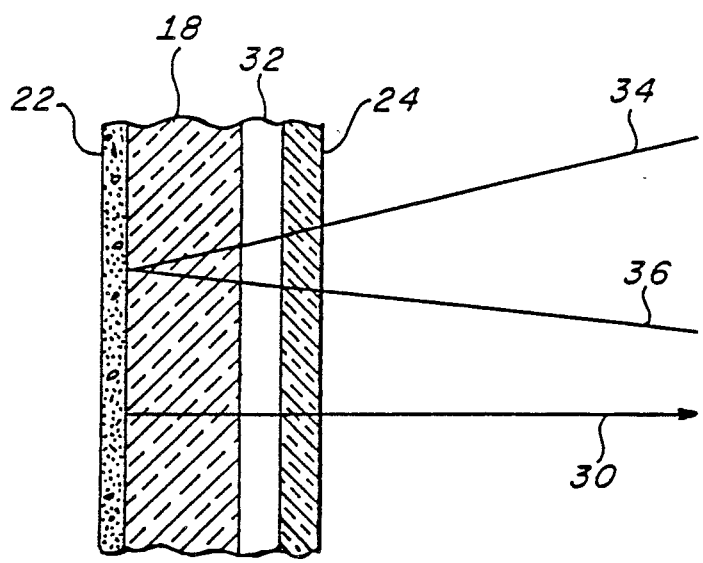
FIG. 2 is an enlarged sectional view of a portion of the faceplate of the tube shown in FIG. 1, illustrating a contrast enhancement filter.

FIGS. 1 and 2 refer to a structure in which a constrast enhancement filter 24 is affixed to the outer surface of the faceplate 18. While this illustrates a bonded filter, this structure is to be considered exemplary and not limiting. The objective of the configuration is to provide clearly to the viewer an undisturbed view of images formed by the electron beam on the cathode ray phosphor screen within the faceplate 18 under a wide range of ambient viewing conditions.

FIG. 2 shows a light beam 30 emitted by the phosphor screen 22 as it passes through the faceplate 18, bonding layer 32, and contrast filter 24. In a normal tube structure of the character described above, it has been found that ambient light rays 34 falling on the phosphor layer 22 will seriously interfere with the visibility of the light image produced by phosphor layer 22 by producing reflected rays 36. In accordance with the prior art, ambient light is considerably reduced with respect to the emitted light beams 30 by means of neutral density filtering which is achieved within the contrast filter 24. This filter effect occurs since the direct ray 30 is attenuated only once in its passage through filter 24, while the incident ray 34 must pass twice through the filter, thus incurring a higher degree of attenuation. The filter may be bonded to the faceplate 18 by a transparent adhesive layer 32 contained between the viewing face of the faceplate 18 and inner face of the filter 24. It is desirable that the materials of the cathode ray tube faceplate 18, the filter 24, and the adhesive layer 32 bonded together have substantially the same index of refraction, thereby eliminating undesirable reflections due to refractive mismatches at the interfaces.

Figure 3:
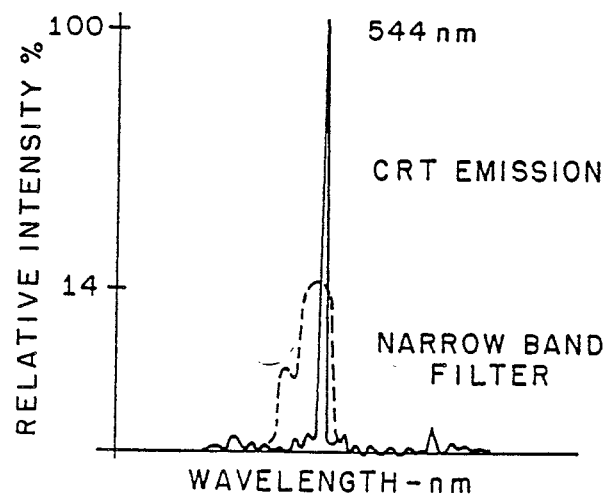
FIG. 3 is a graph illustrating the light transmission characteristics of a typical monochrome filter.

In some cathode ray tubes (CRT's) the light emitted by the phosphor 22 is desirably limited to a predetermined narrow region of the visible spectrum by appropriate selection of the phosphor material. A typical phosphor is the conventional P-43 phosphor having most of its energy concentrated in the green portion of the visible spectrum, having a wavelength of about 544 nanometers, as shown in FIG. 3. Accordingly, such CRT's can be more effectively filtered by a narrow-band filter which transmits the green wavelength spectrum, but which absorbs all other incident wavelengths, than they can by a neutral density filter.

Figure 4:
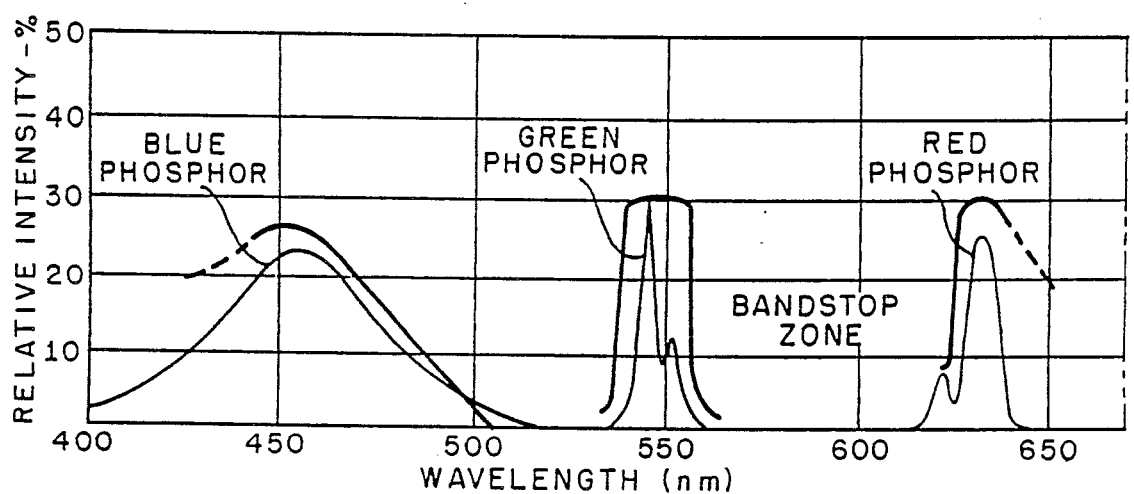
FIG. 4 is a graph illustrating the desired bandpass characteristics of an optimum color filter.

FIG. 4 shows the emission spectra of a color cathode ray tube, having blue, green, and red components. A filter with three pass bands, each transmitting only those red, green and blue wavelengths emitted by the display, is desired to effectively improve the contrast ratio. The present invention provides a contrast enhancement filter for color displays (particularly shadow-mask CRT's) which performs in a manner similar to high performance narrow-band contrast enhancement filters presently used for monochrome displays. In particular, the present invention provides a filter transmission characteristic which closely matches the emission spectrum of the display, as shown in FIG. 4. To achieve this result with an absorbing dye which absorbs three appropriate narrow-band spectra has not proven feasible. Rather, this invention randomly disposes a plurality of individual dye materials within the filter, each of the dye materials having the proper spectral distribution for transmitting one and only one primary color.

Figure 5:
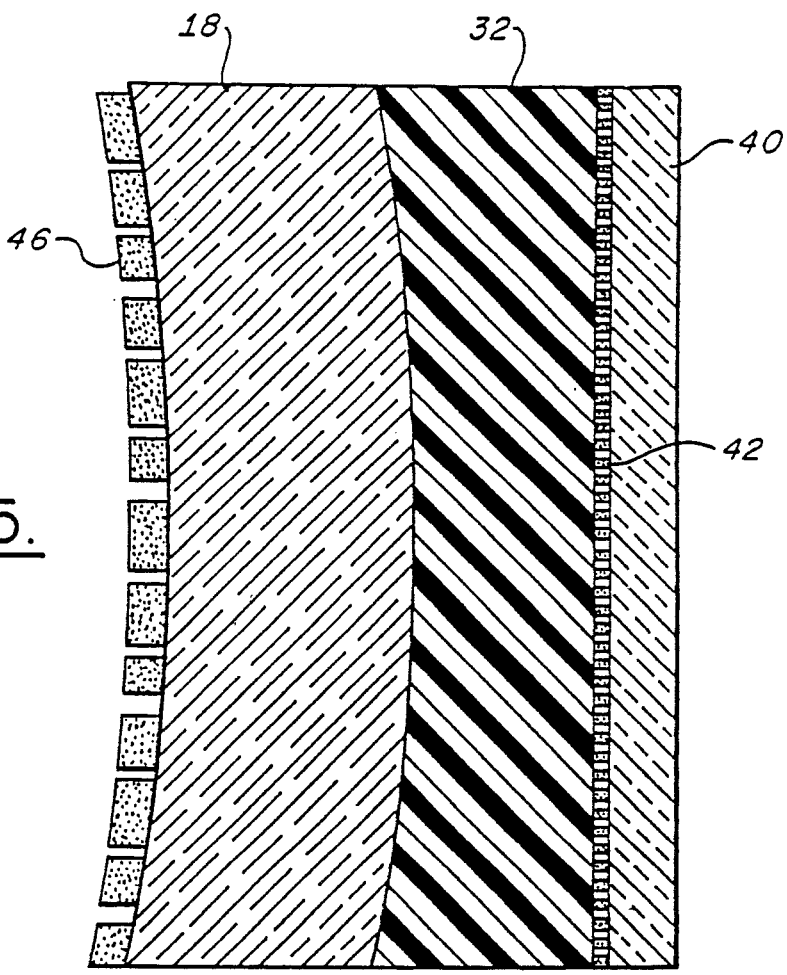
FIG. 5 is an enlarged sectional view of a portion of the faceplate of the tube shown in FIG. 1 embodying the invention.

FIG. 5 shows an embodiment of the invention in which the filter is implemented in the form of a substantially transparent planar substrate 40 on which are located colored pigment dye areas 42. The filter plate may be adhered to the outer surface of the faceplate 18 by a transparent resin 32 or heat bonded in a furnace. Triads of phosphor elements 46 comprising phosphor layer 22 of the viewing screen are deposited on the inner surface of the faceplate 18.

An approach to fabrication of the absorbing filter is through application of absorbing filter materials, patterned using photolithographic techniques. One such technique is to provide a substrate of transparent material such as a color-responsive photosensitive gelatin, coated with a photoresist material such as dichromate. The resist is patterned to provide a plurality of dots in a random pattern, corresponding to a statistical distribution of the primary red, green, and blue color elements. A dye having a color value corresponding to a selected primary color is applied to the patterned substrate, which is then coated with a transparent protective coating. This process is repeated with a second and third layer of material, each layer corresponding to a given one primary color, and the dot pattern being disposed so that dots in different layers do not overlap.

Figure 8:
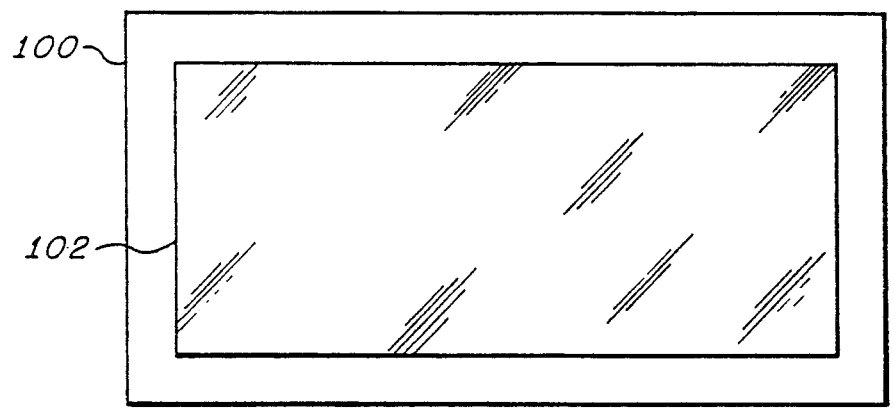
FIGS. 8 and 9 are plan views showing the structure of an optical filter prepared by selective electro-deposition of a dye.

Referring now to FIG. 8, a photoresist gelatin is used to form a coating 80 on one planar surface of a transparent substrate 82, such as glass, by any conventional method, such as spin coating. The photoresist is exposed to a source of light by using a mask 84 and developed to form a photoresist layer 86 having a predetermined pattern defining a plurality of color areas which correspond to a first plurality of primary color transmission elements representative of a given primary color of the light-responsive elements of a color display device.

The developed photoresist layer 86 is then dyed in a conventional manner with the corresponding given primary color (e.g., red) to form a first plurality of primary color transmission (i.e., filter) elements.

A protective layer of a transparent material 88 is then deposited to cover the entire surface and serve as a substrate for subsequent processes. Suitable materials are well known in the art of photolithographic processing.

A second coating of photoresist gelatin is then applied, exposed through a mask, and developed to form a photoresist layer 90 having a second predetermined pattern of color areas which correspond to a second plurality of primary color transmission elements representative of a second given color of the light-responsive elements. The developed photoresist layer is then dyed with a second primary color (e.g., green). This is followed by a second protective layer of transparent material 92.

A further layer of photoresist material 94 is exposed, patterned, and dyed with a third primary color (e.g., blue) and covered with a final layer of protective transparent material 96. Note that to assure maximum brightness and avoid Moire patterns, the first, second, and third plurality of color areas thus formed are disposed in a random pattern so that a plurality of color areas of a given color overlay each of the corresponding primary colors of the light-responsive elements.

Another process is adapted from a method used for fabricating color faceplates for liquid crystal displays. Here a single substrate is patterned with three groups of transparent, electrically conductive dots corresponding to the red, green, and blue primary colors desired in the finished color filter. Each group is comprised of a plurality of electrically interconnected dots which will be commonly colored. The groups are then selectively electroplated with an appropriately colored dye material.

Figure 9:
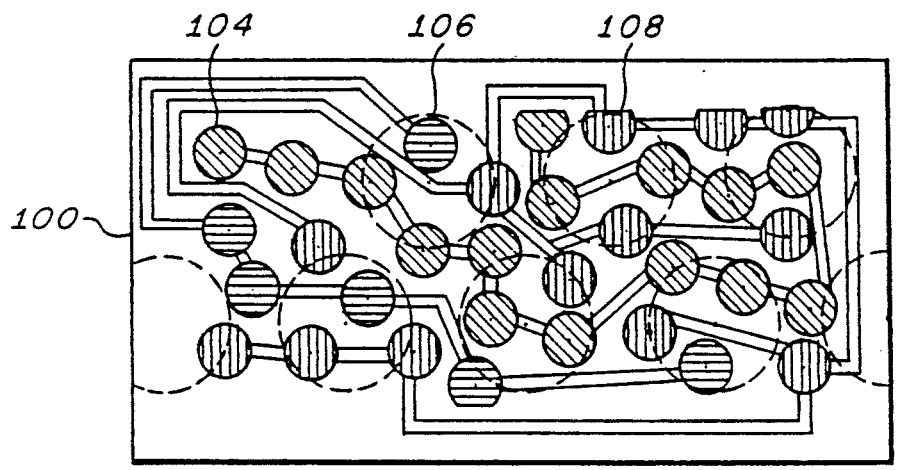

FIGS. 8 and 9 illustrate the method of making such a filter. A substrate 100 of optically transparent material is coated with a transparent, electrically conductive material. The coating may be applied to the substrate and then patterned to form three groups of electrically conductive areas, corresponding, for example, to red, green and blue primary colors 104, 106, 108, respectively. Each group is then selectively electroplated as heretofore described.

Each group of dyed areas is disposed with respect to the distribution of the red, green and blue color elements, so that a plurality of dyed areas of each group is patterned over each of the red, green and blue elements of the color display device.

Figure 7:
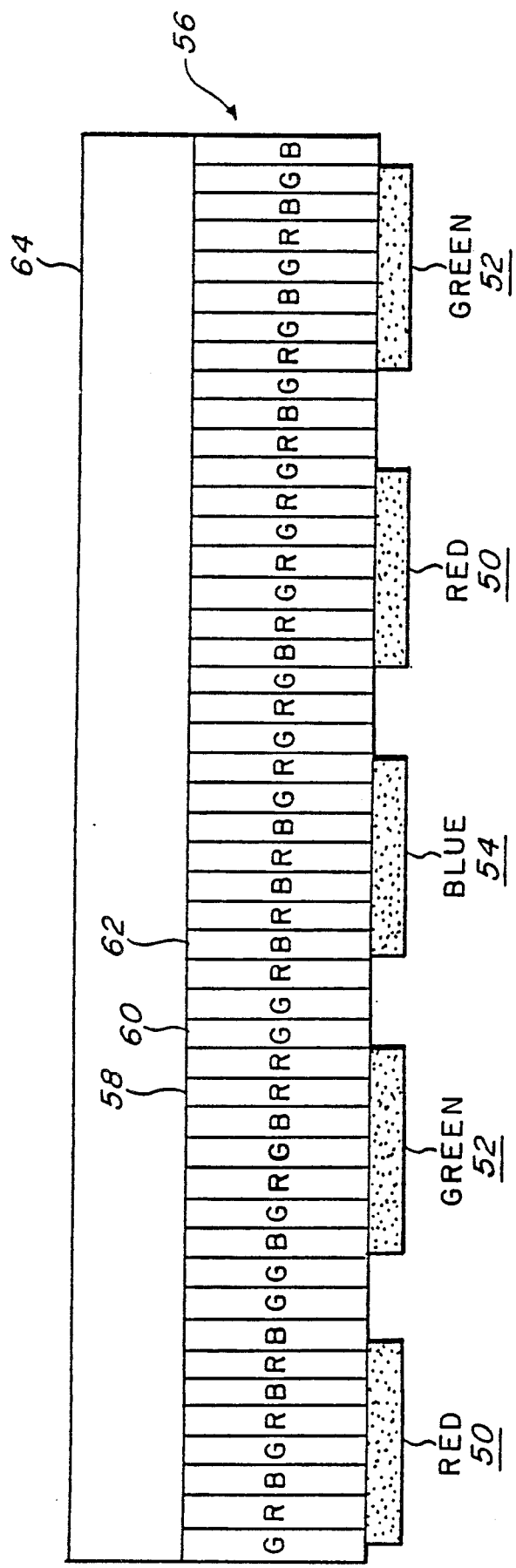
FIG. 7 is an enlarged view in cross-section of an optical filter as in FIG. 6 emphasizing the fiber-optic filter elements, as in the present invention.

In a further embodiment as shown in FIG. 7, the filter plate may be designed to have substantial thickness, which offers certain advantages over the planar structure described above. One structure for implementing controlled thickness of the colored areas is to implant colored glass fibers. A filter structure of this type may be fabricated by modifying techniques well known in the art for fabricating fiber-optic collimating plates. While the prior art uses clear glass fibers, here colored fibers are used. A glass blank is doped with a colorant representing a primary color and drawn into a fiber. The fiber is then cut into sections and the lengths fused with fibers of other primary colors to form a fiber packet comprised of three primary colors, red, green, and blue, whose transmission spectra correspond to those desired to individually act as narrow band filters for each light-emitting phosphor dot. The packet is then drawn, fused, and the process repeated until the desired fiber diameter is reached. The resultant fused fibers are then distributed in a random pattern and fused to provide a cohesive R-G-B group of fibers. The fused fibers may be bonded to a transparent substrate and the resulting filter plate can be lapped to provide a predetermined fiber depth and predetermined thickness and flatness of the plate. The filter plate may be bonded to a faceplate or alternatively may be adapted for use as a faceplate 18 of a CRT, thus obviating the need for a separate faceplate and filter, thereby improving optical efficiency as well as simplifying construction, as compared to the laminated or composite structure.

FIG. 7 shows in schematic form an enlarged cross-sectional view of such a fiber-optic faceplate. Red, green and blue phosphor dots 50, 52, 54 are sequentially disposed on the faceplate 56 which is comprised of a clear glass plate 64 on which are embedded a plurality of red, green and blue dyed fibers 58, 60, 62. Each fiber 58, 60, 62 aborbs light independently because of the spacial dispersion with respect to each other and with respect to the phosphor color dots. The viewing angle is determined by the fiber dimensions and the thickness of the plate. For good optical properties, both surfaces of the filter will be lapped to a desired flatness.

Figure 6:
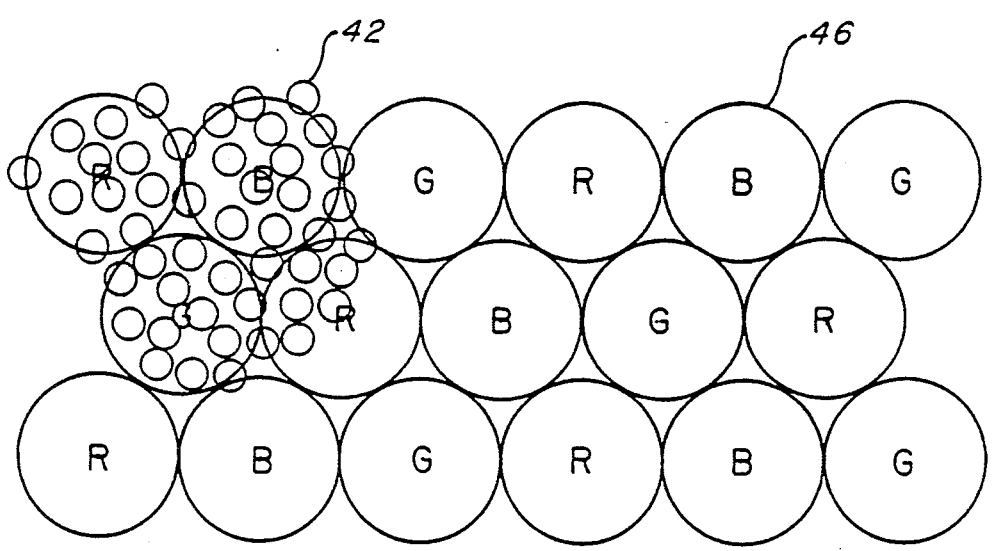
FIG. 6 is a diagrammatic representation of the structure of the present invention, showing a portion of the screen of the tube of FIG. 1 in plan view.

In order to minimize Moire' effects, it is preferable to randomize the locations of the color-dyed areas or fiber particles 58, 60, 62, or to make the size of each area or fiber overlaying the phosphor dots small with respect to the phosphor dots, as shown in FIG. 6. Further, to assure uniformity of brightness, it is important to distribute several filter elements of a given color over a phosphor dot of the same color. Shadow mask CRT's generally have phosphor dots of greater than 0.0045 inch diameter. Therefore, filter elements having dimensions of 0.0015 inch or smaller are suitable.

When colored glass fibers are used, the index of refraction of all fibers must be closely matched. If not matched, fibers of lower index will act as a cladding for fibers of higher index, and produce an undesirable angular property in which the viewing angle of each color is different.

Advantageously, the fiber-optic filter can be designed to have a specific acceptable angle, beyond which all light will be absorbed. This directional property depends on the length of the fiber with respect to the spacing between fibers of different colors. When the optical path through the filter requires passage through different colored fibers, all light will be absorbed. This property can be tailored to any acceptable angle by adjusting the length of the fiber, and can be useful when complete absorption of ambient light incident on the display from angles beyond a specified acceptance angle is desired. Thus, for example, a fiber length equal to its diameter will provide a viewing angle of about 45 degrees, while a length of twice the diameter will limit the viewing angle to about 30 degrees.

In a preferred embodiment, the present invention is applied to a color CRT display tube. For a shadow mask CRT display it is well known to those skilled in the color CRT art that separate beams of energy are generated, usually from three separate electron guns, which beams are normally focused on a phosphor screen through a mask spaced from the interior surface of the faceplate, on which the phosphor is deposited. For example, in a shadow mask structure the screen is comprised of a multiplicity of minute openings through which the beam triad passes and then diverges to energize corresponding arrays of dot triads of red, green, and blue phosphors, resulting in red, green, and blue emissions from the face of the CRT. FIG. 6 shows a portion of such triad elements labelled R, G and B and corresponding to red, green, and blue phosphors, respectively. Other phosphor configurations, such as non-circular regions, or even parallel stripes, may be employed. The colored pigmented dye areas, comprising a multiplicity of a given primary color value, superposed on a phosphor dot of the same color value, are indicated by reference 42.

Figure 10:
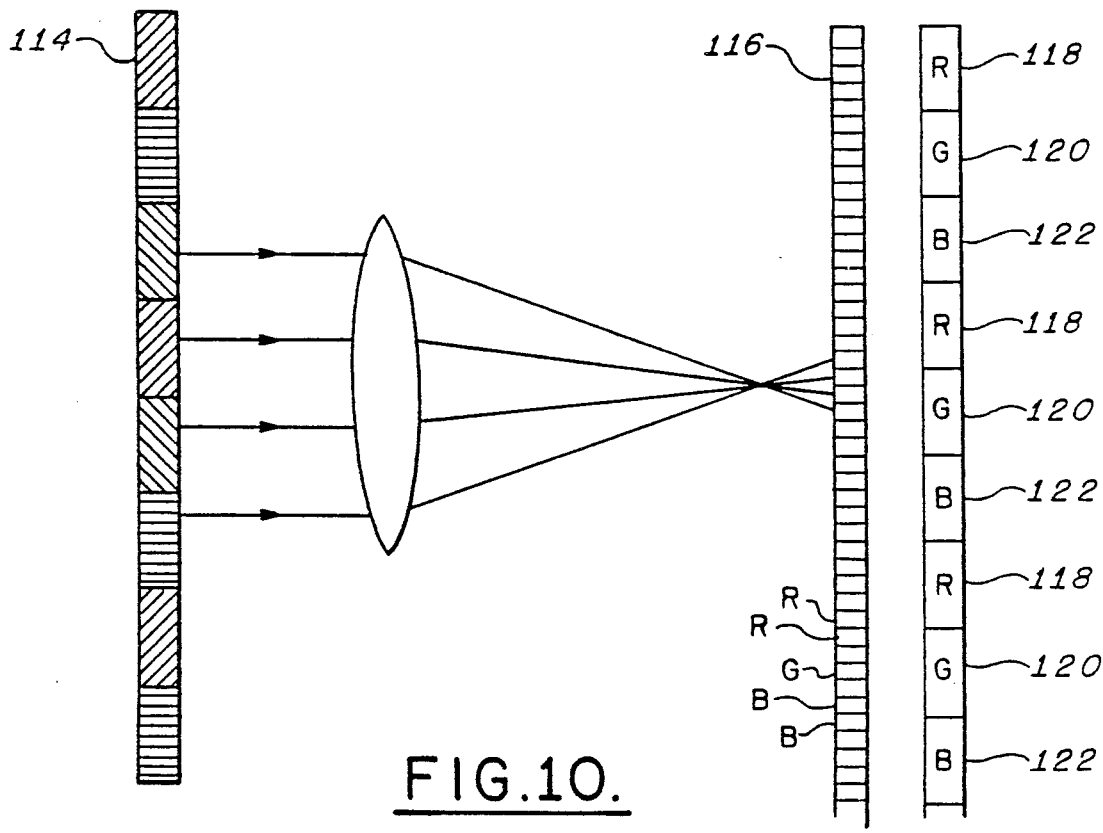
FIG. 10 is a sectional view showing a process for preparing an optical filter by exposure of a color transparency.

In a further embodiment as shown in FIG. 10, an absorption filter may be formed by photographing a master image, patterned with primary color areas of dimensions and separations as described above. The method of manufacture is to expose a photographic emulsion with the color pattern formed by the master image 114 and to develop the latent image to form a color transparency 116 whose primary color areas R, G, B overlay the corresponding light-responsive display elements 118, 120, 122 of a color display. The resultant transparency may be reduced or enlarged to suit the display face of a variety of display devices, and used as the absorption filter described above.

While the examples given herein have primarily exemplified cathode ray tubes having phosphorescent light-emitting elements, this is not to be considered limiting, as the invention is applicable to any device empolying light-responsive elements, which may be phosphorescent or of variable transmissibility, such as liquid-crystal elements. As an example, the disclosed embodiments of the the invention have primarily described absoptive filter material located on a substrate which is subsequently attached to the front surface of a light emitting or transmitting color display, it is understood that the substrate may be the front plate of the display itself.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. An optical filter for contrast enhancement of a color display, said display comprising a light-responsive layer having a plurality of discrete elements, each of said elements adapted for emitting or transmitting light in a predetermined primary color wavelength, said optical filter comprising:

an optically transparent substrate adapted for superposition over said light-responsive layer, and having a plurality of colored areas arranged in clusters of at least one primary color superposed over each of said discrete elements, each of said plurality of colored areas so constructed and adapted to transmit selectively a narrow band color spectrum corresponding to at least one said predetermined primary color wavelength of said discrete elements and substantially to absorb color wavelengths other than said one predetermined primary color wavelength, and wherein each of said discrete elements is further associated with a multiplicity of colored areas of a given color transmissibility, areas of a given primary color transmissibility being illuminated when the underlying discrete element is activated by a source of electrical energy.

2. An optical filter as set forth in claim 1, wherein said discrete elements have a first predetermined diameter and said colored areas have a second predetermined diameter substantially less than said first predetermined diameter.

3. An optical filter as set forth in claim 2, wherein said discrete elements have a diameter of at least 0.0045 inch, and said color areas have a diameter not exceeding 0.0015 inch.

4. An optical filter as set forth in claim 1, wherein said colored areas are comprised of longitudinal fiber-optic particles oriented with their lengths parallel to one another and orthogonal to the plane of said discrete elements, said particles having substantially identical indices of refraction, each of said particles being selectively dyed to provide a transmission color spectrum corresponding to at least one of said primary color wavelengths, and means for bonding said particles to said optically transparent substrate.

5. An optical filter as set forth in claim 4, wherein said fiber-optic particles have a predetermined length and a predetermined spacing between fiber-optic particles of a different color transmissibility, the ratio of said length to spacing defining an optical acceptance angle wherein ambient light impinging on said optical filter outside of said angle is substantially totally absorbed.

6. An optical filter as set forth in claim 5, wherein said fiber-optic particles have a first predetermined diameter and said discrete elements have a second predetermined diameter, the ratio of said second to said first diameters being at least 3:1.

7. An optical filter as set forth in claim 4, wherein said optical filter is adapted to form a faceplate of a cathode ray tube.

8. An optical filter as set forth in claim 4, for use with a cathode ray tube, said cathode ray tube having a faceplate for receiving said filter, further comprising:

an optically transparent resin for bonding said filter to said faceplate, wherein said filter, said resin, and said faceplate have substantially the same index of refraction.

* * * * *